Feb. 8, 1938.  R. F. PEO  2,107,341
GOVERNOR CLUTCH
Filed May 31, 1935   3 Sheets-Sheet 3

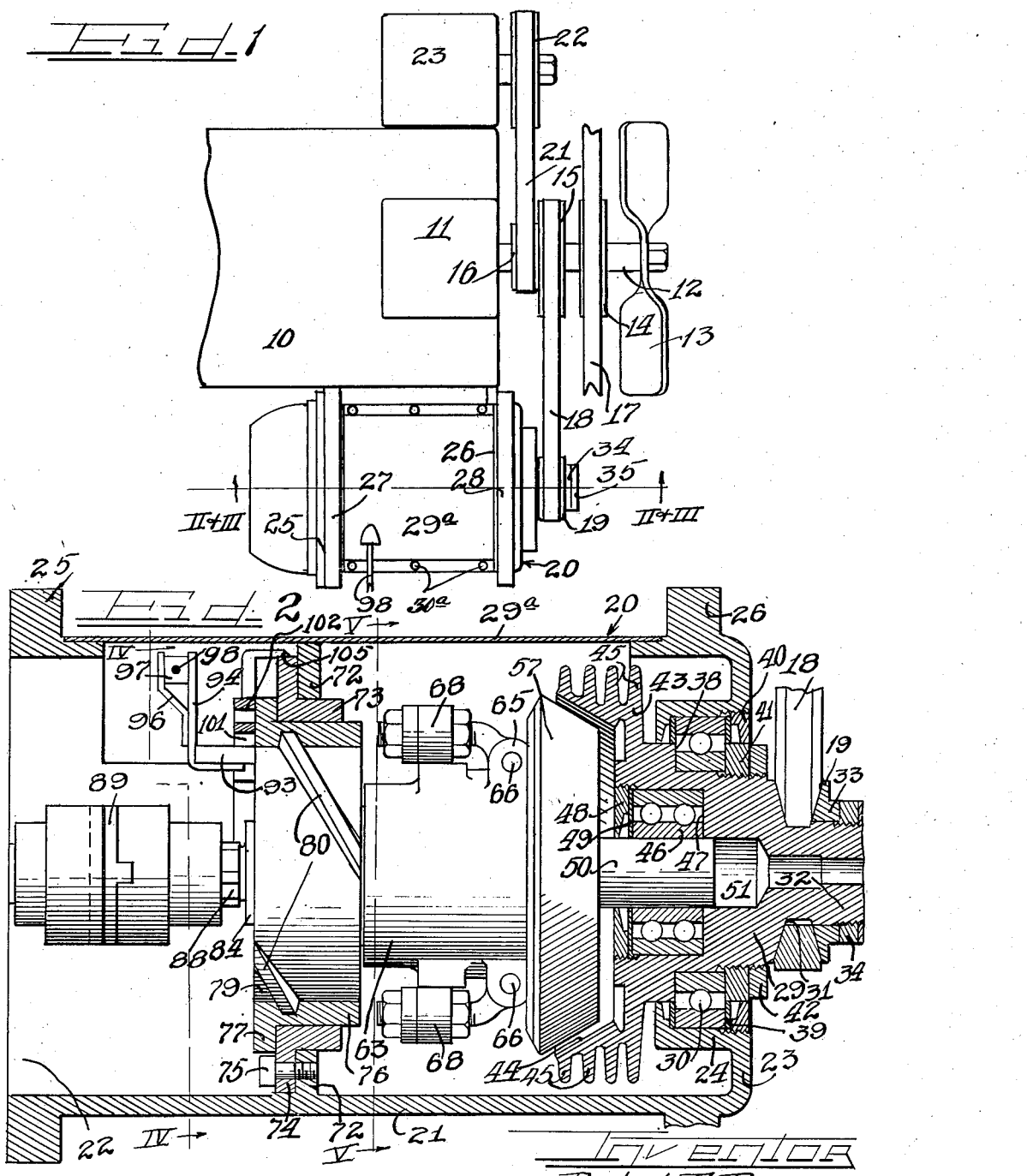

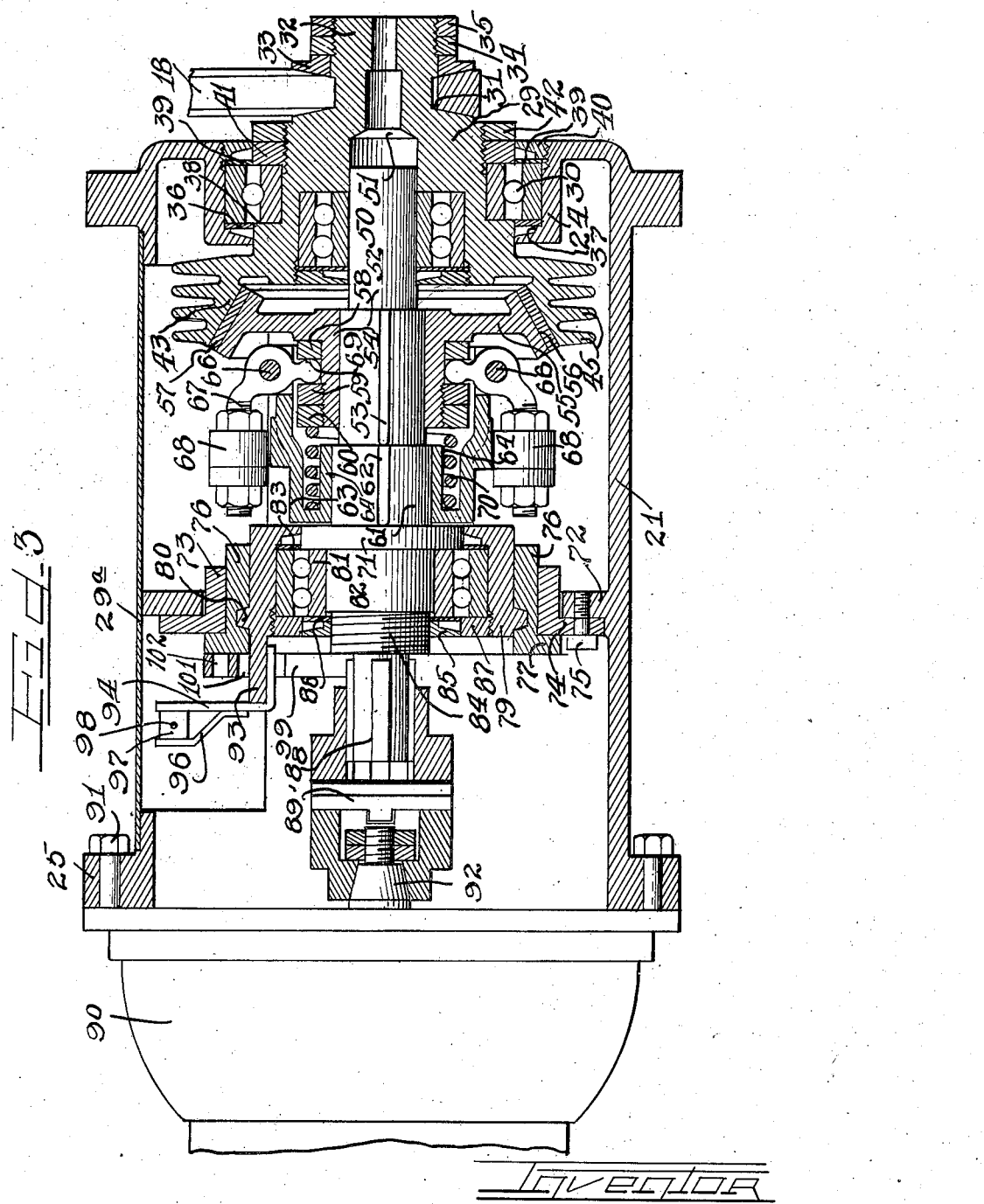

Inventor
Ralph F. Peo.
by Charles O'Neill Atty.

Patented Feb. 8, 1938

2,107,341

UNITED STATES PATENT OFFICE 2,107,341

GOVERNOR CLUTCH

Ralph F. Peo, Buffalo, N. Y., assignor to Houde Engineering Corporation, Buffalo, N. Y., a corporation of New York Application May 31, 1935, Serial No. 24,307

9 Claims. (Cl. 192—104)

This invention relates to a governor clutch adapted to automatically disengage when driven beyond a predetermined speed.

More specifically this invention relates to a centrifugal cut-out clutch mechanism adapted to drive a member such as for example a compressor, within a desired range of speed from a fluctuating source of power which may exceed the desired speed range.

The governor clutch of this invention is primarily adapted to drive a refrigerant compressor for an automobile air conditioning system from the automobile engine. Since the speed of the automobile engine varies throughout a wide range during even normal driving and since the compressor must be driven at a speed within a relatively narrow range the governor clutch of this invention has been designed to automatically disengage or cut out when the engine drive exceeds the top speed designed for operation of the compressor. Then, when the compressor speed decreases the clutch momentarily engages with the engine drive to bring the compressor up to its maximum speed whereupon the clutch again disengages. The clutch operates entirely by centrifugal force of weights carried on the clutch fingers and is preferably driven through a belt connection with the fan of the engine.

It is therefore an object of this invention to provide a governor mechanism adapted to drive a device within a desired range of speed from a fluctuating source of power which may exceed that desired range of speed.

Another object of this invention is to provide a governor clutch mechanism for directly rotating a device within a speed range which is less than the speed range of the driving member.

A further object of this invention is to provide a clutch mechanism for directly rotating a compressor from a fluctuating source of power which is adapted to disengage when the power source exceeds a predetermined maximum speed and to momentarily engage with the source of power at the high speed range to maintain substantially a desired top speed for the compressor.

Another object of this invention is to provide a friction clutch mechanism for driving a refrigerant compressor directly from an automobile engine when the engine is operating at low rates of speed and adapted to disengage from the engine drive when a predetermined top speed is reached and also adapted to reengage momentarily with the engine drive at this speed as the speed of the compressor decreases.

Other and further objects of this invention will become apparent from the following detailed description of the annexed sheets of drawings which form a part of this specification.

On the drawings:

Figure 1 is a fragmentary top plan view illustrating diagrammatically the manner of mounting the clutch mechanism of this invention on an automobile engine.

Figure 2 is an enlarged cross-sectional view taken substantially along the line II—II of Figure 1 with the driven portion of the clutch mechanism shown in elevation.

Figure 3 is an enlarged cross-sectional view taken substantially along the line III—III of Figure 1 with the driven clutch mechanism shown in cross-section.

As shown on the drawings:

Figure 4:
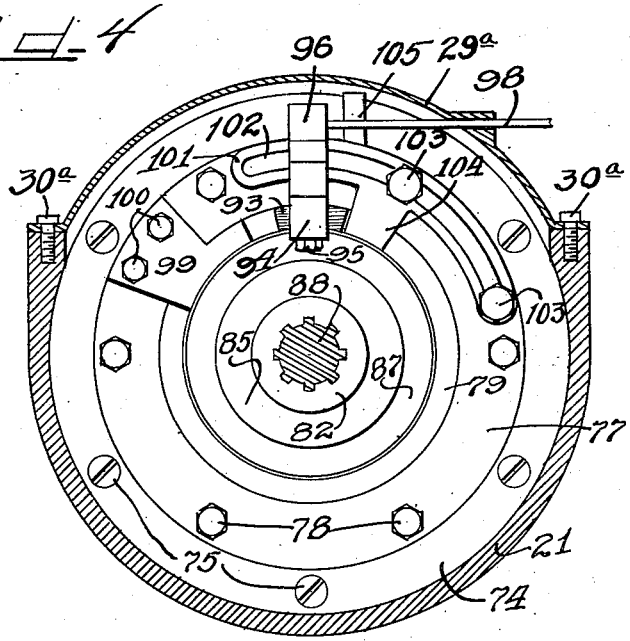
Figure 4 is a vertical cross-sectional view taken substantially along the line IV—IV of Figure 2.
Figure 5:
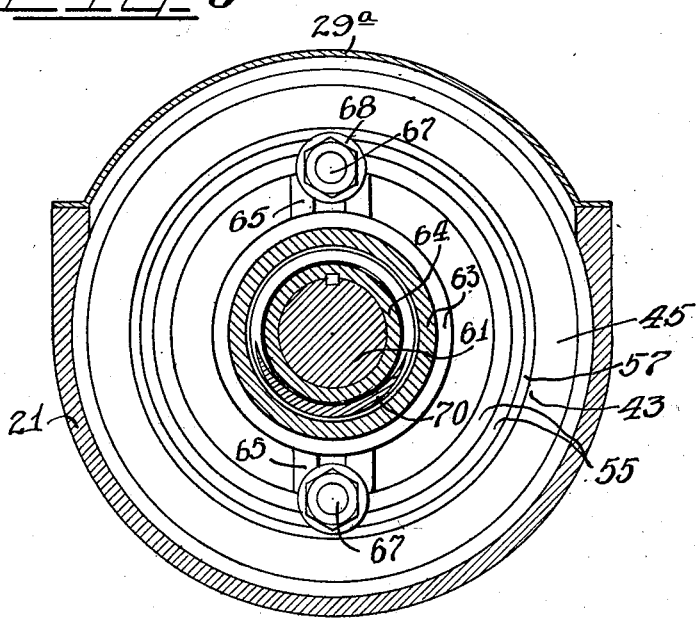
Figure 5 is a vertical cross-sectional view taken substantially along the line V—V of Figure 2.

In Figure 1 the reference numeral 10 indicates the head of an internal combustion engine such as an automobile engine. Mounted on the head 10 at the front end thereof is a jack shaft or bearing housing 11 in which is rotatably mounted the end of a shaft 12. The shaft 12 has secured thereon, at the other end thereof, a fan 13. The shaft 12 also carries pulleys 14, 15 and 16 respectively as shown. These pulleys are secured to the shaft and rotate therewith. The shaft 12 is driven by a belt 17 trained over the pulley 14. As is customary the belt 17 is driven from the crank shaft of the engine. The pulley 15 has trained therearound a V-shaped belt 18 for driving a pulley 19 of the governor clutch mechanism 20.

The pulley 16 has trained therearound a belt 21 for driving a pulley 22 of the generator 23. It is thus obvious that the governor clutch mechanism 20 of this invention can be readily mounted on an automobile engine by placing the mechanism on one side of the engine and by placing the generator on the other side of the engine and driving both the generator and the clutch mechanism from the fan shaft through belts.

The governor clutch mechanism 20 comprises a housing or casing 21 of substantially cylindrical shape having a free open end 22 as shown in Figure 2 and an inturned flange 23 at the other end thereof carrying a depending leg 24 for defining an annular recess in which is mounted the driving portion of the clutch mechanism as will be more fully hereinafter described. The housing or casing 21 is provided with a laterally extending flange 25 at the free end 22 thereof and a similar flange 26 at the other end thereof. A hooped band 27 (Fig. 1) secured to the block of the motor beneath the head 10 may be tightened around the flange 25. Similarly a hooped band 28 carried by the motor block may be tightened around the flange 26 to support the housing 21 on the motor.

The housing 21 has a cutaway portion closed by a plate 29a bolted to the housing by bolts 30a (Fig. 4). The plate 29a is thus readily removable from the housing to permit inspection of the mechanism therein.

The pulley 19 which is driven by the belt 18 is formed in a member 29 (Figs. 2 and 3) rotatably mounted in the recess formed by the annular flange 24 on a bearing 30 carried by the flange 24. The member 29 has a sloping face 31 and a laterally extending threaded portion 32. A member 33 having a sloping face is slipped over the portion 32 to define together with the sloping face 31 of the member 29 a V-shaped groove for receiving the belt 18. Since the member 33 can be moved any desired distance from the face 31 it is obvious that this groove may be varied in size to fit different size belts. The position of the member 33 is maintained by a nut 34 threaded onto the portion 32. Another nut 35 serves to lock the nut 34 in position.

A grease retainer washer 36 abuts a shoulder 37 formed on the flange 24 for holding the bearing 30 against lateral displacement. The bearing 30 also abuts a shoulder 38 formed on the member 29. Another washer 39 is disposed around the other side of the bearing 30 and held thereagainst by a bushing 40 threaded on the flange 24.

The member 29 carries in threaded relation thereon a bushing 41 in abutting relation to the bearing 30 as shown. This bushing 41 may be locked against rotation by a nut 42 also threaded on the member 29. In this manner, the member 29 is freely rotatable on the bearing 30 within the recess formed by the flange 29 of the housing 21, but is held against lateral displacement by the washers and bushings just described. The member 29 has an integral flange portion 43 provided with a conical seat 44 forming the female member of the clutch mechanism. The flange 43 may be provided with fins 45 to cool the member. The member 29 has a recess in the center thereof for receiving a bearing 46. The bearing is held in this recess against the shoulder 47 thereof by a bushing 48 threaded into the recess and urged against a grease retaining washer 49 abutting the bearing. A shaft 50 extends through the bearing 46 into a well 51 in the member 29.

For convenience, the bearing 46 may be termed the pilot bearing of the clutch mechanism, and the shaft 50 may be termed the supporting shaft. This shaft 50 is slidable in the pilot bearing into and out of the well 51 of the member 29. As best shown in Figure 3, the supporting shaft 50 has a portion 52 of larger diameter provided with a longitudinally extending keyway or slot 53. A boss 54 is carried on the portion 52 and keyed in the slot 53. Since the key slot is elongated, the boss 54 may slide longitudinally on the shaft portion 52 but must rotate with the shaft.

The boss 54 has a flange portion 55 provided with a face 56 which may be frusto-conical as shown or may range from a face parallel with the axis of the boss 54 to a face at right angles to the axis of the boss. Friction material 57 is secured onto the face 56 and forms the male portion of the clutch mechanism. A washer 58 is disposed around the boss 54 in abutting relation to the flange 55 for a purpose to be hereinafter described. Likewise, nuts 59 and 60 are threaded onto the boss 54 in spaced relation from the washer 58.

Adjacent to the portion 52 of the shaft 50 is another portion 61 of larger diameter than the portion 52. This portion 61 also has formed therein a slotted keyway 62. A housing member 63 is disposed around the portion 61 of the shaft 50 and is provided with an inturned flange 64 which is keyed in the slot 62. The outside walls of the housing 63 are extended to pass over the washers and nuts carried by the boss 54. Ears or lugs 65 (Figure 2) are formed on the housing 63 near the end thereof and have pivoted therein, on pins 66, a pair of clutch fingers 67 carrying weights 68. The fingers 67 have a rounded knob portion 69 thereon extending into the space between the washer 58 and the nut 59 on the boss 54.

A coiled spring 70 is disposed around the flange 64 of the housing 63, as shown, and is urged against the nut 60 carried by the boss 54. As shown in Figure 3, the housing 63 abuts a collar 71 on the supporting shaft 50. The spring 70 therefore urges the boss 54 toward the boss 29 and the friction material 57 on the flange 55 of the boss 54 engages the conical seat 44 of the boss 29. However, when the boss 54 is rotated at a high rate of speed beyond a predetermined desired speed range, the weights 68 carried on the clutch fingers 67 fly outward by centrifugal force. The rounded portion 69 on the fingers thereupon moves against the nut 59 to slide the boss 54 against the pressure of the spring 70 to disengage the clutch.

The housing 21 has formed integrally thereon an inturned flange 72 extending around the inside of the housing. The flange 72, however, may or may not extend across the portion of the housing covered by the inspection plate 29. As shown, it does extend across this portion.

An annular collar 73 having a laterally extending flange 74 is bolted through the flange 74 to the flange 72 of the housing by means of bolts 75. A bushing 76 is seated within the collar 73 and has an outturned flange 77 bolted to the collar 73 by means of bolts 78 (Figure 4). The bushing 76 is internally threaded to receive a bearing cup 79 having a helical thread 80 extending therearound in seated engagement with the corresponding threaded groove in the bushing member 76.

As best shown in Figure 3 the bearing cup has seated therein a bearing 81 which is disposed around a portion 82 of the shaft 50 and abuts the collar 71 of the shaft. A grease retaining washer 83 is disposed around the collar 71 against the outer race of the bearing 81.

The shaft portion 82 is threaded at the end thereof as shown at 84 and a bushing 85 is threaded onto this portion of the shaft. A washer 86 is disposed between the bushing 85 and the inner race ring of the bearing 81.

An annular collar 87 is disposed around the bushing 85 and threaded into the bearing cup as shown in Figure 3. It is therefore evident that the shaft 50 may rotate within the bearing cup without rotating the cup. At the same time the shaft is held against longitudinal movement by the bushings and washers described above.

The shaft 50 has a laterally extending splined portion 88 in slidable engagement within an Oldham coupling 89.

The compressor pump may encased in a housing 90 as shown in Figure 3. The housing 90 is readily bolted to the governor clutch housing 21 by bolts 91 extending through the flange 25 of the housing 21. The coupling 89 serves to join the supporting shaft 50 of the clutch mechanism with the drive shaft 92 of the compressor (not shown).

As shown in Figures 2, 3, and 4, the bearing cup 79 has a lug 93 integral therewith and extending laterally therefrom. An L-shaped metal strip 94 is bolted onto this lug 93 by bolts 95 extending through the base of the L-shaped member 94 and through the lug 93. The strip 94 carries an offset metal strip 96 as shown and a pivot member 97 is disposed between the strips 94 and 96. The pivot member 97 receives therethrough the end of a Bowden wire 98.

As best shown in Figure 4 a stop member 99 is bolted onto the flange 77 of the bushing 76 by means of bolts 100. When the Bowden wire 98 is released to push the strip 94, the lug 93 is forced into contact with the stop member 99. This movement rotates the bearing cup 79 to withdraw the shaft 50 and the male clutch mechanism carried thereon from engagement with the female clutch mechanism thereby manually disengaging the clutch. It should be understood that the supporting shaft 50 can freely slide in the pilot bearing 46 and in the Oldham coupling 89.

The flange 77 of the bushing member 76 also has bolted thereon an arcuate member 101 provided with a groove 102. Bolts 103 extend through the groove 102 to clamp the member 101 onto the flange 77. The member is readily set into proper adjusted position by loosening the bolts 103 and sliding the member along the groove 102.

The member 101 carries a stop member 104 adapted to contact the lug 93 of the bearing cup. The member 101 also carries, on the opposite side thereof, an indexing finger 105 which, as shown in Figure 2, lies over the collar 73 which may be provided with a graduated scale at this point. When it is desired to manually engage the clutch mechanism the Bowden wire 98 is pulled to move the lug 93 of the bearing cup against the stop member 104 thereby rotating the bearing cup and causing the supporting shaft 50 to slide into the well 51 of the boss member 29. The proper engagement of the friction material 57 with the female clutch member 43 can be nicely regulated by adjusting the position of the stop member 104. This adjustment is accurately made by loosening the bolts 103 and sliding the member 101 along the groove 102. The amount of movement can be accurately determined by the indicating finger 105. Thus as the friction material 57 wears away the member 101 may be moved to withdraw the stop member 104 further away from the stop member 99 thereby permitting the lug 93 to move through a greater distance before contacting the stop member 104.

The Bowden wire control for manually engaging and disengaging the clutch mechanism can be operated from the dash board of the automotive vehicle. This wire, as is customary, is capable of effecting movement of the bearing cup 79 in both directions.

Since the indexing finger 105 is positioned immediately under the inspection plate 29 it is obvious that the movement of the stop member 101 can be readily inspected when adjusting the clutch member.

While the governor clutch mechanism is described as being driven through a belt from the fan shaft of the engine, it should be understood that it can also be driven from any source of rotating power from the engine. For example the mechanism may be connected to the water pump shaft or to the cam shaft of the engine.

Furthermore the female clutch member 43 may be provided with diagonal fan blades around its outer periphery and the housing 20 may be vented so that a circulation of air is effected thru the housing by the fan blades to cool the operating parts.

From the above description it should be understood that the governor clutch mechanism of this invention provides a free wheeling connection between the automobile engine and the compressor pump for an automotive air conditioning system. When the automobile engine exceeds a speed greater than the maximum speed desired for rotating the compressor pump the clutch mechanism is disengaged through centrifugal force. As the rotation of the compressor pump slows down the clutch mechanism is momentarily engaged with the engine to bring the compressor pump up to speed. This action continues intermittently as long as the Bowden wire control permits engagement of the clutch mechanism. When the Bowden wire is released, however, the clutch mechanism cannot be engaged during any speed of operation of the motor.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A governor clutch mechanism comprising a driving member, a shaft slidably mounted within said driving member, a driven member keyed to said shaft, means for sliding said driven member along said shaft to engage the driven member with the driving member, means operative by centrifugal force to disengage the driven member from the driving member, and means for manually sliding said shaft to control the operation of said clutch mechanism.

2. A governor clutch comprising a driven member, a pilot bearing carried by said driven member, a supporting shaft slidable through said pilot bearing, a driven member keyed to said supporting shaft, means for sliding said driven member relative to said supporting shaft into engagement with the driving member, clutch fingers operative by centrifugal force to disengage said driven member from the driving member and manually operable means for moving said supporting shaft axially to control the operation of the clutch.

3. In a governor clutch mechanism, a driving clutch member, a pilot bearing carried by said member, a supporting shaft slidably mounted in said pilot bearing, a driven clutch member keyed to said supporting shaft and slidable thereon, a spring for urging said driven clutch member in engagement with the driving clutch member, means operative by centrifugal force carried by the driven clutch member to disengage said member when rotated beyond a predetermined speed range, a bearing cup for receiving the other end of said supporting shaft therein in free rotatable relation, a helical thread on the outside of said bearing cup, a bushing for receiving said bearing cup in threaded relation, and a manually operable Bowden wire for rotating said bearing cup in said bushing to slide said supporting shaft thereby moving the driven clutch member thereon into and out of engagement with said driving clutch member.

4. In a governor clutch, a manually operable control mechanism comprising a supporting shaft, a bearing cup for receiving said shaft, means for securing said shaft against longitudinal movement in said bearing cup, said bearing cup having a helical thread therearound, a bushing for receiving said bearing cup in threaded relation, and a Bowden wire connected with said bearing cup to rotate the same relative to the bushing for longitudinally moving said supporting shaft.

5. In a governor clutch having a driving member carrying a pilot bearing, a supporting shaft slidable at one end thereof in said bearing, a driven clutch member slidably keyed on said shaft, a spring urging said driven clutch member toward the driving member, a bearing cup carrying a bearing for rotatably supporting the other end of said shaft, means securing said shaft against longitudinal movement relative to said bearing cup and manually operable means to move said bearing cup toward and away from said driving clutch member to slide the shaft in the pilot bearing and thereby engage and disengage the clutch.

6. In a clutch mechanism, a housing, an internally threaded collar secured in said housing, a bearing cup threaded in said collar, a bearing in said cup, a clutch supporting shaft rotatably mounted in said bearing, means securing said shaft axially in said bearing cup and manually operable means to rotate the bearing cup in the collar thereby axially moving said shaft for engaging and disengaging said clutch.

7. In a clutch, a housing, an internally threaded collar in said housing, a bearing cup threaded in said collar, a driven clutch mechanism carried by said bearing cup, a driving clutch mechanism rotatably mounted in the end of said housing, a Bowden wire operatively connected with said bearing cup for rotating the cup in the collar to move the driven clutch mechanism toward and away from said driving clutch mechanism and stop members secured to said collar for limiting the amount of rotation of the bearing cup.

8. A governor clutch mechanism comprising a housing, a collar secured in said housing having a helical thread cut therein, a bearing cup threaded in said collar, a driven clutch member carried by said bearing cup, a driving clutch member rotatably mounted in the end of said housing for engaging with said driving clutch member, a lug extending from said bearing cup, a Bowden wire operatively connected with said lug for rotating said cup to move the driven clutch member into and out of engagement with said driving clutch member, a stop member secured to said collar for limiting the travel of the lug when moving the driven clutch member out of engagement with the driving clutch member, a second stop member on said collar for limiting the travel of said lug when moving the driven clutch member into engagement with the driving clutch member and means for adjusting the position of said second stop member to compensate for wear of the clutch members.

9. A compressor pump drive mechanism for automotive air conditioning systems comprising a housing adapted to be secured to an automobile engine, a driving clutch member rotatably mounted in said housing, means extending from said housing secured to said driving clutch member for connection with a source of rotative power from the automobile engine to drive the driving clutch member, a driven clutch member in said housing, a slidable shaft supporting said driven clutch member, means for urging said driven clutch member on said shaft into engagement with the driving clutch member, means operative by centrifugal force to disengage the driven clutch member when the same is rotated beyond a predetermined speed and manually operable means adapted to slide the shaft to disengage the driven clutch member.

RALPH F. PEO.